Figure 5:
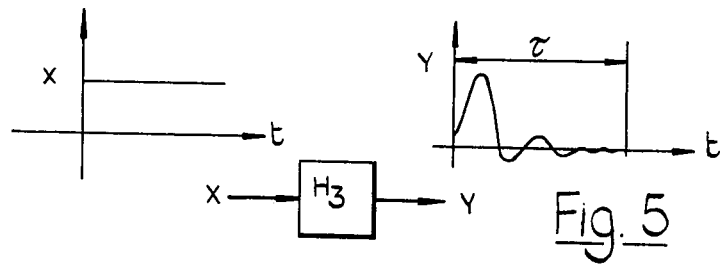

United States Patent [19]

Bjor et al.

[11] 4,237,463
[45] Dec. 2, 1980

[54] DIRECTIONAL COUPLER

[75] Inventors: Håkon E. Bjor, Hvalstad; Bjørn H. Raad, Oslo, both of Norway

[73] Assignee: A/S Elektrisk Bureau, Nesbru, Norway

[21] Appl. No.: 952,984

[22] Filed: Oct. 20, 1978

[30] Foreign Application Priority Data

Oct. 24, 1977 [NO] Norway ............................. 773627

[51] Int. Cl.³ ............................................. H04B 1/12
[52] U.S. Cl. .................................................... 370/27
[58] Field of Search ......................... 343/180; 178/59; 179/170.2

[56] References Cited

U.S. PATENT DOCUMENTS

| | | | |
|---|---|---|---|
| 3,535,473 | 10/1970 | Flanagan | 179/170.2 |
| 3,566,031 | 2/1971 | Carbone | 178/59 |
| 3,696,429 | 10/1972 | Tressa | 343/180 |
| 3,821,494 | 6/1974 | Bessevre | 179/170.2 |
| 4,126,770 | 11/1978 | Sato | 179/170.2 |
| 4,144,417 | 3/1979 | Oshima | 179/170.2 |

Primary Examiner—David L. Stewart
Attorney, Agent, or Firm—Darby & Darby

[57] ABSTRACT

A directional coupler for duplex transmission for use with a transmitter/receiver unit is described. It includes a memory unit for providing a correction signal and a compensation circuit to which the correction signal is applied to supress that portion of the received signal which is derived from the transmitter. The memory unit is capable of storing values of the correction signal, the values being assigned to the different possible varients within a selected period of time, of time functions coming from the transmitter, and a decoder connected between the transmitter and the memory unit for detection of actual, transmitted signal variants. The decoder includes means for selection in the memory unit of the values of the correction signal assigned to the actual signal variants.

11 Claims, 16 Drawing Figures

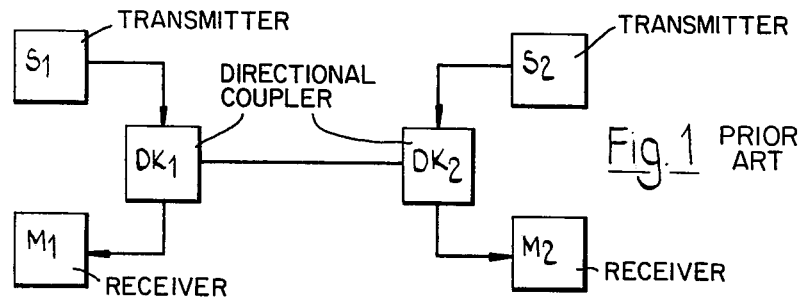
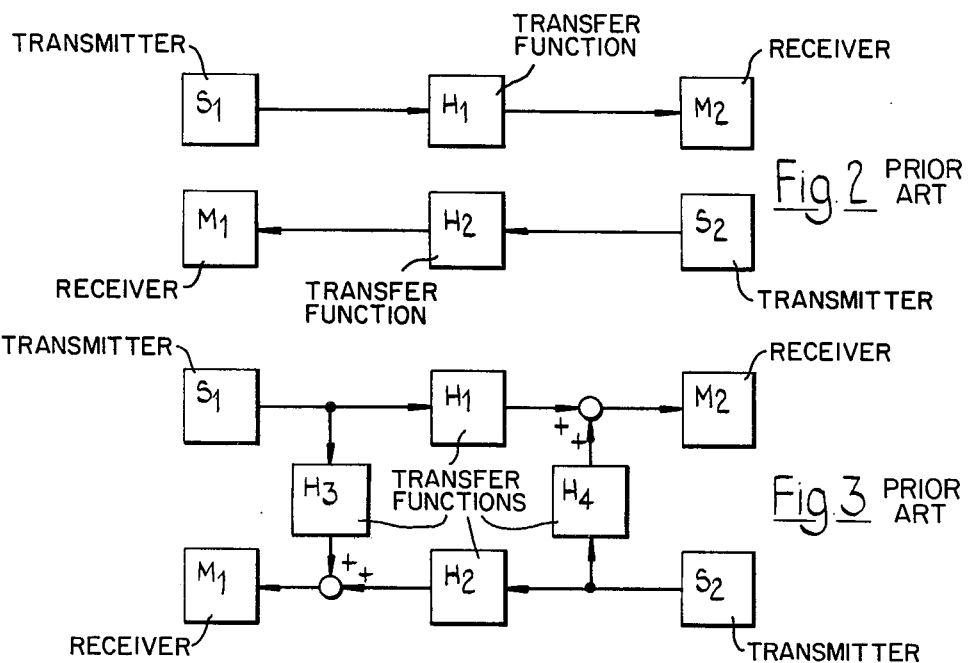
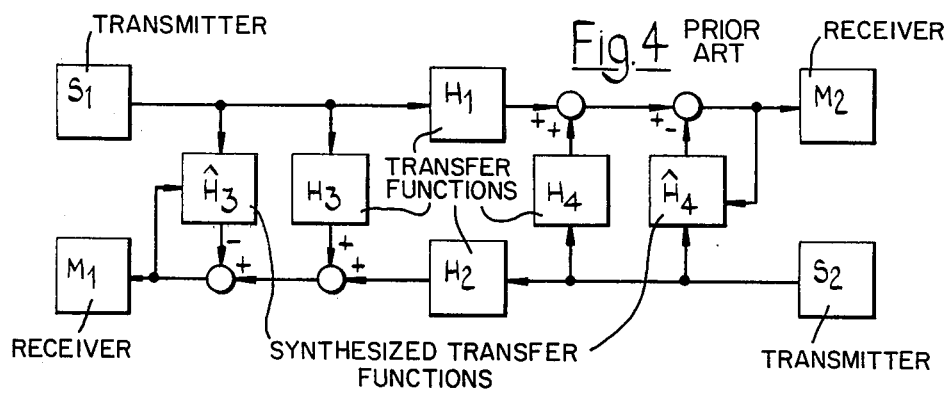

DIRECTIONAL COUPLER

The present invention relates to a directional coupler for duplex transmission, said coupler including a device for providing a correction signal and a compensation circuit to which said correction signal is applied for supression of that part of the received signal which is caused by its own transmitted signal.

The known technique is illustrated in FIGS. 1-4.

A general block diagram as shown in FIG. 1 illustrates duplex transmission on a single transmission channel, S, denoting transmitter, M denoting receiver and DK denoting directional coupler (traditionally a hybrid transformer). The connection between the two directional couplers is a simple transmission channel, e.g. a two-wire line.

With an ideal coupler one would obtain an equivalent diagram as shown in FIG. 2, where $H_1$ and $H_2$ are the transfer functions of the line in the two directions.

However, in practice a portion of the signal from $S_1$ will in addition be transferred partly through the coupler and partly be reflected via the line to $M_1$ with a transfer function $H_3$, and likewise from $S_2$ via a $H_4$ to $M_2$, as will appear from FIG. 3.

The unwanted transfer functions $H_3$ and $H_4$ are in general complex and in many applications variable with respect to time.

Known methods for eliminating the effect of $H_3$ and $H_4$ (echo-cancellation) consist in synthesizing a correction signal in the form of a copy of the signal (provided by $\hat{H}_3$ and $\hat{H}_4$) of the signal caused by $H_3$ and $H_4$ respectively, and subtract that from the incoming signal, as e.g. shown in FIG. 4.

The circuit can be made adaptive by means of feedback if it may be assumed that transmitted and received signals are uncorrelated (statistically independent).

Known methods for synthesizing the transfer function $\hat{H}_3$ use:

(a) Convolution integral:

$$y(t) = \int_0^\infty h(\tau) \cdot x(t - \tau) d\tau$$

where $h(\tau)$ is the impulse response of the line.

(b) Transversal filter:

$$y(t) = \sum_{n=1}^{n} \alpha_n \cdot x(t - n\tau)$$

where $\alpha_n$ is the coefficients of the filter and where $x(t)$ and $y(t)$ are input and output signals of $\hat{H}_3$, respectively.

Both methods can be made adaptive by repeated measurement of the impulse response of the line and modifications of $h(\tau)$ and $\alpha_n$, respectively, dependent therefrom. A great disadvantage of both methods is that they require complicated apparatus with a great demand for computing capacity.

The directional coupler according to the invention has as its object to avoid the said disadvantages by simple means. The inventive coupler is characterized by the features appearing from the subsequent patent claims and are described by means of examples of embodiments in the description hereinafter with reference to the drawings.

FIGS. 1-4 show prior art techniques.

Figure 6:
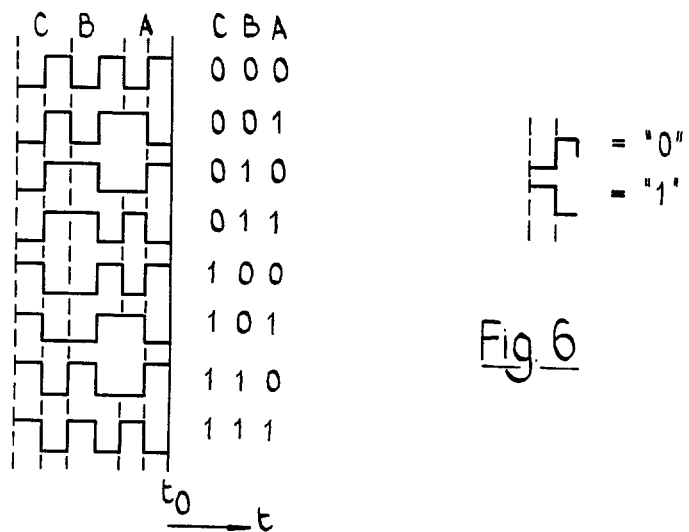
Figure 7:
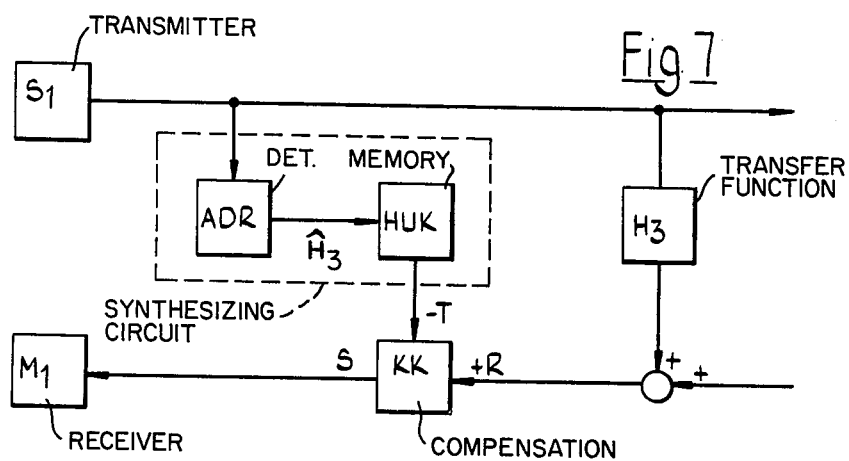
Figure 8:
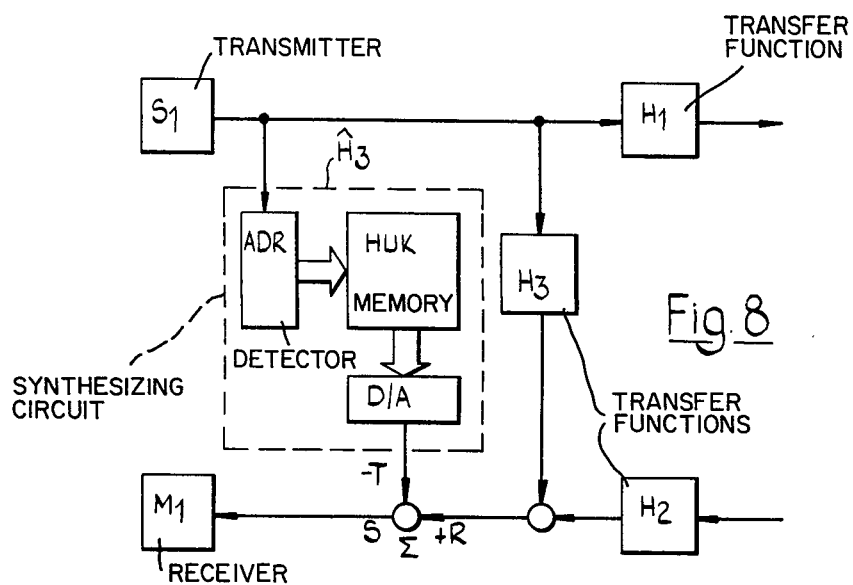
Figure 9:
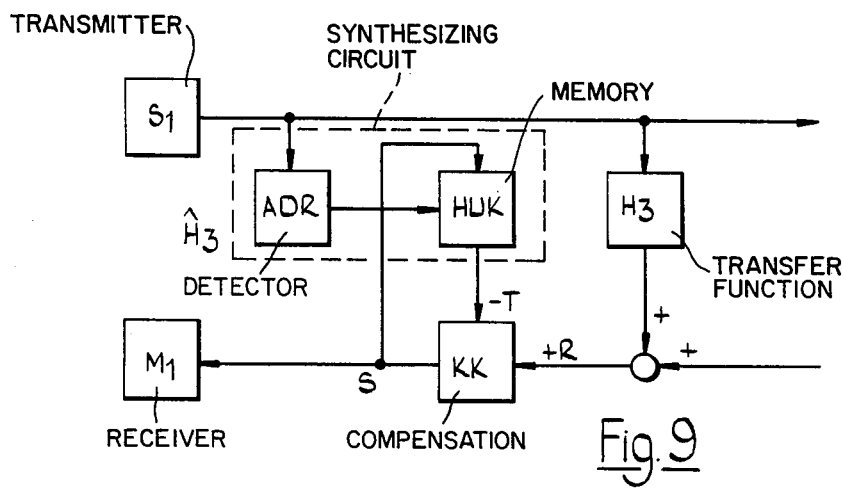
Figure 10:
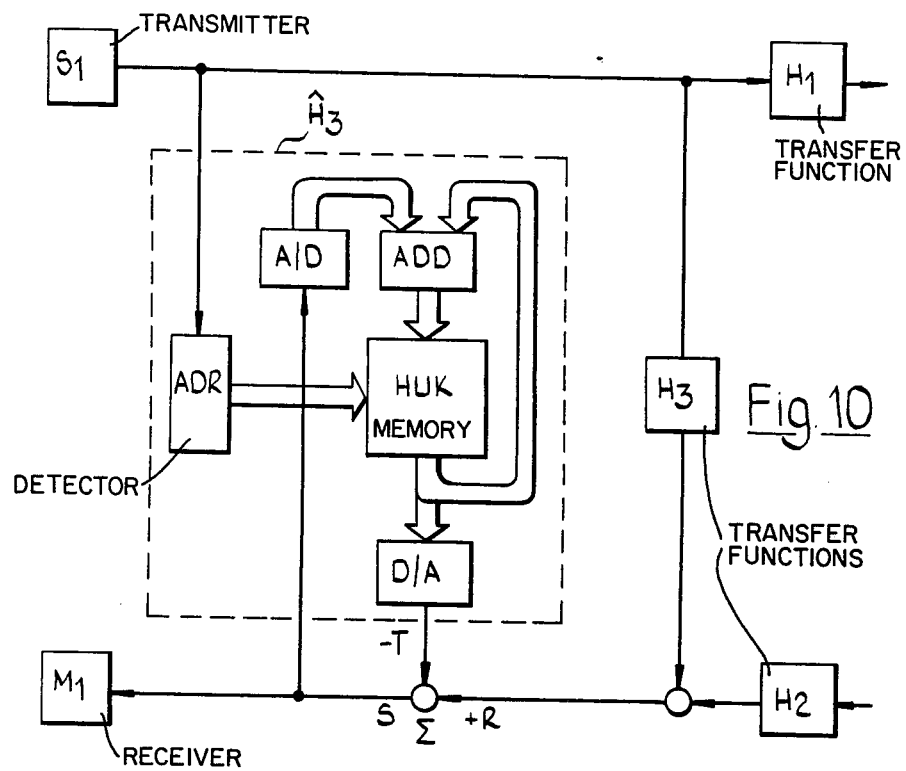
Figure 11:
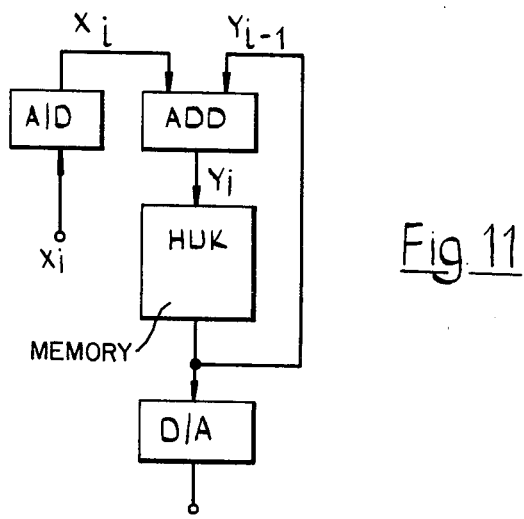
Figure 12:
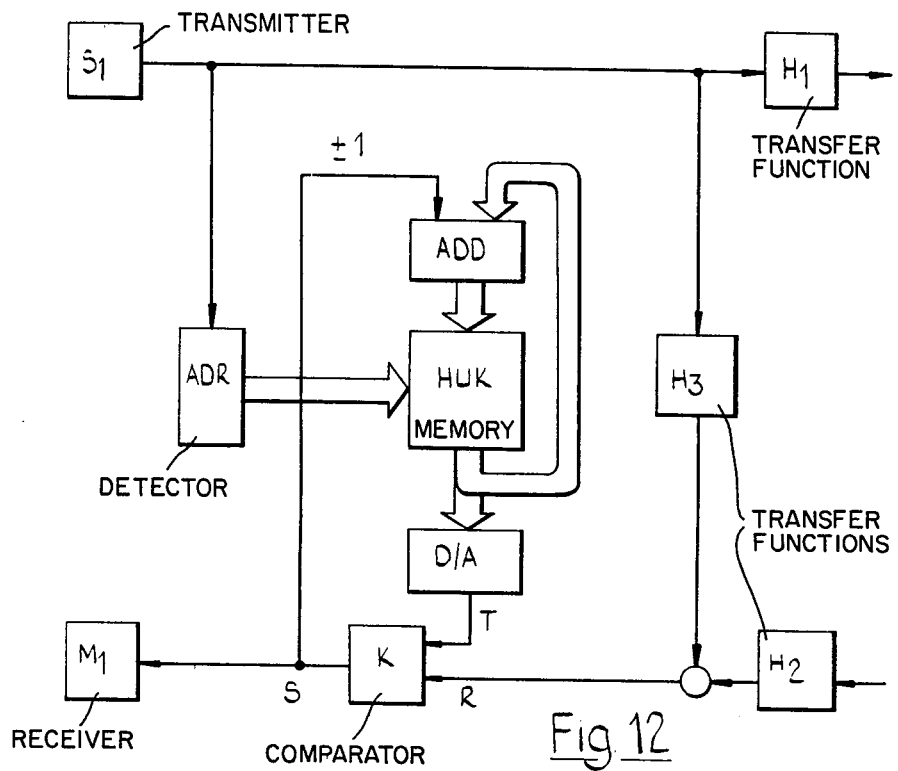
Figure 13:
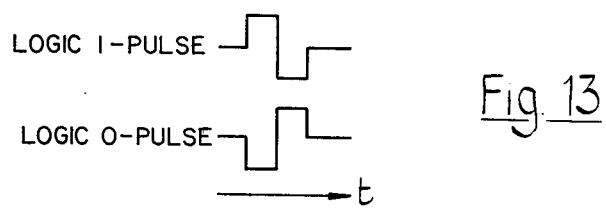
Figure 14:
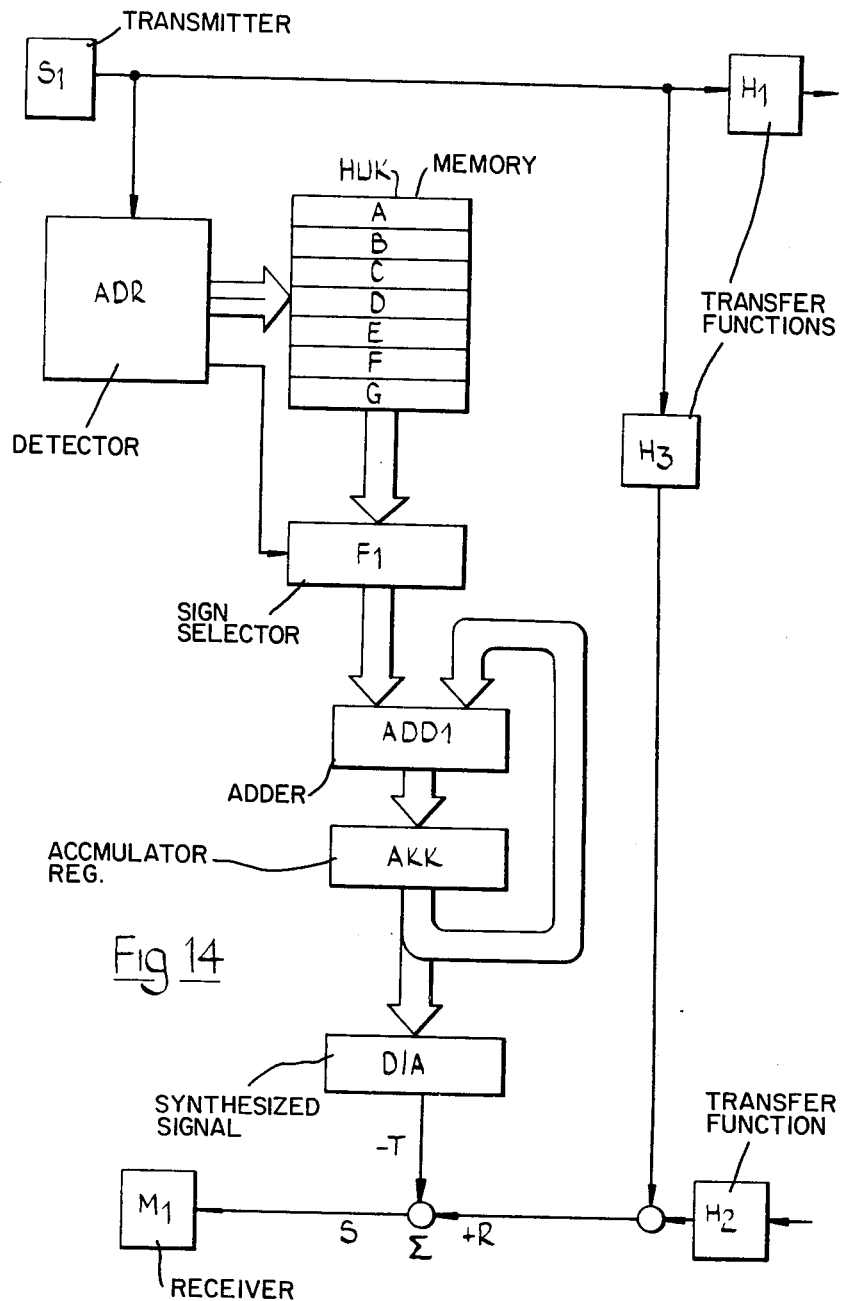
Figure 15:
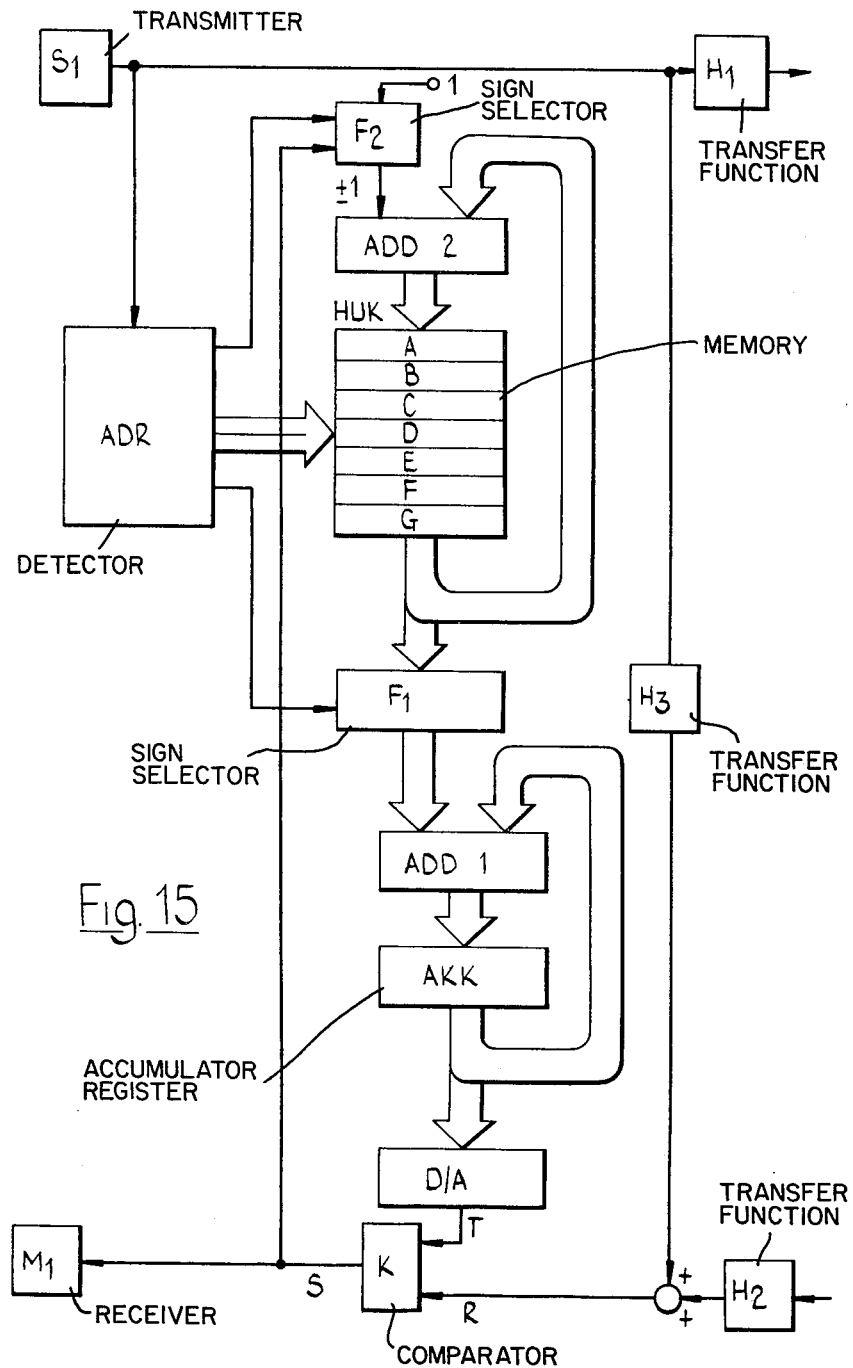
Figure 16:
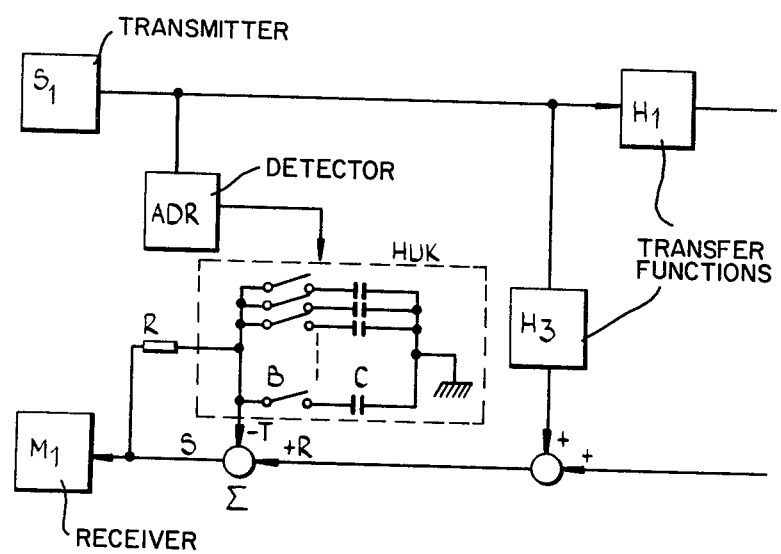

FIG. 5 illustrates step-response for $H_3$.
FIG. 6 is an example of biphase signal.
FIG. 7 illustrates the principle of the invention.
FIG. 8 depicts a simple embodiment of the coupling, according to the invention.
FIG. 9 depicts a modification of the invention as it has been illustrated in FIG. 7.
FIG. 10 depicts an adaptive version of the directional coupler according to the invention.
FIG. 11 depicts a digital integrator in the coupling of FIG. 10.
FIG. 12 depicts a simplified adaptive version of the coupling in FIG. 10.
FIG. 13 depicts an example of the biphase signal.
FIG. 14 depicts a modification of the coupling in FIG. 8.
FIG. 15 depicts a modification of the coupling in FIG. 12.
FIG. 16 depicts an analogue embodiment of the coupling.

What makes $H_3$ complex is the output signal being dependent on the time function of the input signal over a certain time, see FIG. 5.

In practice it will be a finite memory time $\tau$ which is important.

If $x(t)$ within a period of time $\tau$ has a finite number of possible variants of time functions, it is possible to tabulate the corresponding variants of the value $y$ and use the description the time function of $x(t)$ to choose the y-value.

Realization becomes particularly simple if $x(t)$ is, for example, a digital biphase signal, since an array of, for example, three periods of a biphase signal only can appear in $2^3 = 8$ different ways, see FIG. 6.

For practical lengths of lines $\tau$ may, for example, be approximately of the duration 2-4 biphase periods. That is, the number of differenct antecedents (previously transmitted signals) is $2^2 - 2^4 = 4 - 16$, for a definite point of time during the biphase period. The number of points of time in the period being necessary to observe/synthesize may be from 1-8 or more, depending on synchronizing conditions and other system specifications. Thus, the number of different values of y at the sampling times are 4-128. Practical figures are: 3 periods antecedents and 8 samples per period, i.e. a total of $2^3 \times 8 = 64$ different values of y.

FIG. 7 illustrates how according to the present invention one may provide a circuit for synthesizing the signal which is to compensate for the effect of transfer functions $H_3$, which as seen is caused by reflections of the transmitted signal from $S_1$ and crosstalk due to non-ideal balancing of the line. In the figure HUK is a memory unit and ADR is a detector detecting the actual variant of time function from the transmitter $S_1$ and generating the memory address where the assigned value of the actual variant of the signal transmitted from $S_1$ is stored.

The array of assigned values coming from the memory unit yield the correction signal, which in the compensation circuit KK is subtracted from the received signal.

The memory HUK must contain information about the actual transmission channel, so that the signal T, which the circuit $\hat{H}_3$ provides, is equal to the incoming signal R when $S_2$ does not transmit. The difference signal S then becomes zero. When $S_2$ later starts to transmit, the circuit will subtract from the incoming signal R that portion which is caused by its own transmitted signal and the difference S will be the portion which is caused by transmitted signal from $S_2$ via the transfer function $H_2$.

FIG. 8 illustrates an embodiment where the memory unit HUK is a digital, read-only memory, and where the correction signal is converted to analogue form in a digital-to-analogue converter D/A. The compensation curcuit is an analogue summing circuit $\Sigma$.

As a requirement for an adaptive version of the directional coupler the transmitted and received signals must be uncorrelated over a certain period of time (statistically independent), but they may be synchronous or asynchronous.

If one observes the instantaneous value of received signal S at $M_1$, see FIG. 7, for several occasions of a definite sequence of the transmitted signal from $S_1$, corresponding to a definite memory address, the average value will be approximately zero as a result of the signals being uncorrelated. A change of the transfer function $H_3$ will however provide a systematic shift of the average value of the received signal.

A registration of said shift and a corresponding modification of the assigned value will bring the content of the memory in conformity with $H_3$ once more. In FIG. 9 is shown a general diagram of such an adaptive version of the directional coupler.

FIG. 10 illustrates an embodiment having a digital write/read memory and an analogue-to-digital converter and adder unit in the memory feed-back path.

The averaging of the received signal takes place in that the analogue-to-digital converter, the adder unit and the memory for a definite address constitute a digital integrator, see FIG. 11, defined by the following equation:

$$Y_i = Y_{i-1} + \alpha X_i \qquad (1)$$

The increment $\Delta Y = \alpha X_i$ (2)

By numerical integration:

$$Y = (1/T) \rho X \cdot \Delta t \qquad (3)$$

and $$\Delta Y = (\Delta t / T) X \qquad (4)$$

$\Delta t$ = step length
T = the time constant of the integrator
Comparing (2) and (4) yields: $\alpha = (\Delta t / T)$ $\alpha$ is determined by the conversion constant of the analogue-to-digital converter and a possible rescaling upon connection to the adder unit and influences the transient time of the integrator. The longer the permissive transient time, the more accurate will be the synthesized signal T.

It has been determined that the analogue-to-digital converter in FIG. 10, which is a comparatively large and complicated circuit, may be omitted by a coupling as shown in FIG. 12, where the compensation circuit is a comparator K.

The circuit of FIG. 10 uses the amount (with sign) of the deviation to modify the content in the memory.

The simplified adaptive circuit in FIG. 12 uses only the sign of the deviation by adding +1, or possibly −1, to the content of the memory.

The difference between the two circuits is mainly that the first one adapts somewhat faster when turned on or upon a large and abrupt change of $H_3$. Both circuits will however during normal operation be equally accurate.

An alternative method is as follows. An increased accuracy of the synthesized signal T requires that a longer portion of the antecedents of the biphase signal be considered. This yields a doubling of the size of the memory for an increase of one period of the antecedents of the biphase signal. For comparatively long lines and high bit-frequencies, it will be required that comparatively extensive antecedents are considered, and in order to save memory space it may be advantageous to provide a somewhat different device as described below.

Instead of letting the memory contain the actual figures which are to be applied to the digital-to-analogue converter, one may in the memory retain parts of the actual figures which have to be added with signs dependent of the antecedents of the transmitted signal in order to obtain the finite output value.

If one considers the biphase signal formed by an array of single pulses having a form shown in FIG. 13, the instantaneous value of the synthesized signal may be said to consist of a contribution from a portion of the closest preceding single pulses which the biphase signal is composed of.

If the memory thus contains figures for the effect of a single pulse, for an array of moments after the commencement of the pulse (the pulse response of the line), the instantaneous value can be recreated by adding with proper sign the content of the memory spaces corresponding to complete biphase periods in time backwards from the sampling moment. The signs are determined from the transmitted biphase signal. Logic 1-pulse provides, for example, + and logic 0-pulse provides −. It must therefore be added so many figures as the number of periods of antecedents of the biphase signal considered necessary.

For a system with 7 periods of antecedents and 8 samples per period the memory may be arranged in registers as follows:

$A_0 \ A_1 \ A_2 \ A_3 \ A_4 \ A_5 \ A_6 \ A_7$
$B_0 \ B_1 \ B_2 \ B_3 \ B_4 \ B_5 \ B_6 \ B_7$
$C_0 \ C_1 \ C_2 \ C_3 \ C_4 \ C_5 \ C_6 \ C_7$
$D_0 \ D_1 \ D_2 \ D_3 \ D_4 \ D_5 \ D_6 \ D_7$
$E_0 \ E_1 \ E_2 \ E_3 \ E_4 \ E_5 \ E_6 \ E_7$
$F_0 \ F_1 \ F_2 \ F_3 \ F_4 \ F_5 \ F_6 \ F_7$
$G_0 \ G_1 \ G_2 \ G_3 \ G_4 \ G_5 \ G_6 \ G_7$ where the index indicates sample number (0–7). Thus, the different registers (A, B, C etc.) contain figures for the effect of a logic pulse (see FIG. 13) at the 1st, 2nd, 3rd etc. period after the pulse was transmitted. (It is assumed that the numerical value of the effect is equal for a logic 1-pulse and a logic 0-pulse). FIG. 14 illustrates how such a circuit can be constructed. ADR denotes an address decoder and sign logic, $F_1$ sign selector, AKK accumulator register and $ADD_1$ adder unit.

The circuit may be made adaptive by updating the registers on the basis of the sign of the output signal S (see FIG. 15).

In order to save computing time it may, for example, be sufficient that only one of the register spaces is updated for each sample. In the course of 56 samples all the spaces will have received an updating. In practice this has for a number of applications proved to be sufficiently frequent, even though the circuit of FIG. 15 then will adapt slower than the circuit of FIG. 12.

The sign logic (included in the ADR unit) determines the sign of the actual periods of the antecedents and provides the sign for the register under treatment. The sign selector sets the correct sign on the figures arriving from the memory.

The unit $F_2$ in FIG. 15 determines if there is to be added or subtracted a 1 to or from the content of a register subjected to updating. This is determined by the sign of the register in question and the sign of the deviation S according to normal sign rules ($-$ and $+$ is $-$, $-$ and $-$ is $+$, etc.).

The principle on which the said circuit is based may also be considered used for other types of pulses, e.g. normal binary code, but one must then define more types of pulse elements (than those in FIG. 13), and corresponding registers for the effect of these.

The number of memory spaces necessary in the system shown in FIG. 15 becomes $$N = n \cdot m$$

where n is the number of samples per period of the biphase signal and m is equal to the number of periods of antecedents. In the previous described system (FIG. 12) there is correspondingly obtained $$N = n \cdot 2^m$$

This system will thus always require more memory spaces, but this is compensated by leaving the rest of the equipment much simpler and setting far less requirements for speed and thereby power consumption. This in turn influences the package density and finally the price.

For many practical applications it is considered sufficient to consider 3–4 periods of the antecedents, and in that case the circuit of FIG. 10 is preferred.

FIG. 16 illustrates an adaptive version of the analogue embodiment of the coupler. In this example each memory location is embodied by a capacitor C and a switch B. The stored values are given by the charges on the capacitors. The coupler is made adaptive by means of introducing a resistor in the feed-back between the summation circuit and the memory HUK for modification of the values selected by the decoder ADR.

In the context of the present disclosure, "antecedents" denotes previously transmitted signals.

We claim:

1. A directional coupler for duplex transmission systems including a transmitter and a receiver comprising compensation circuit means for connection to the receiver,
   correction signal means coupled to said compensation circuit means for providing a correction signal thereto for suppressing part of the signal received by said receiver, which part is caused by the transmitted signal from said transmitter, said correction signal means including memory means for storing values of the correction signal, said values corresponding to different possible time function variants of the signal from the transmitter within a fixed time period, the output of said memory means being connected to said compensation circuit means, and
   decoder means connected to the transmitter for detection of the actual variants of the signal from said transmitter, and coupled to said memory means to select the corresponding values of the correction signal to be applied to said compensation circuit means.

2. A directional coupler as in claim 1 wherein said memory means is digital read-only memory, and said compensation circuit means is an analog summation circuit, and further comprising digital-to-analog converter means connected between said digital memory means and said analog summation circuit.

3. A directional coupler as in claim 2 further comprising adder means for coupling the output of said memory means to said compensation circuit means, wherein the signal from said transmitter is considered composed of a finite number of different elements, said memory means storing partial values of the correction signal corresponding to the effect of said elements.

4. A directional coupler as in claim 3 wherein said adder means is an accumulator added means, said memory means is a digital read-only memory means and said compensation circuit means is an analog summation circuit, and further comprising sign selector means coupled to and operated by said decoder means and coupling the output of said memory means to said adder means, and digital to analog converter means coupling the output of said accumulator adder means to said compensation circuit means.

5. A directional coupler as in claim 1 wherein said memory means is a write/read memory means and said correction signal providing means further comprises a feed-back link from the output of the compensation circuit means to the input of said memory means.

6. A directional coupler as in claim 3 wherein said memory means is a write/read memory means and said correction signal providing means further comprises a feed-back link from the output of the compensation circuit means to the input of said memory means.

7. A directional coupler as in claim 5, wherein said compensation circuit means is an analog adder means and said feed-back link comprises analog-to-digital converter means connected in series with an adder means to the data input of said memory means, and further comprising digital to analog converter means for coupling the output of said memory means to said compensation circuit means and means for coupling the output of said memory means to the input of said adder means.

8. A directional coupler as in claim 5 wherein said compensation circuit means is a comparator means and said feed-back link comprises adder means connected to the input of said memory means for adding $+1$ or $-1$ to the selected value, and further comprising digital to analog converter means for coupling the output of said memory means to said compensation circuit means, the output of said memory means being coupled to the input of said adder means.

9. A directional coupler as in claim 6 wherein said adder means is an accumulator adder means, said memory means is a digital write/read memory and said compensation circuit is a comparator means, and further comprising first sign selector means coupled to and operated by said decoder means and coupling the output of said memory means to said adder means, and digital to analog converter means coupling the output of said accumulator adder means to said compensation circuit means, said feed-back link including second sign selector means coupled to and operated by said decoder means, and second adder means connected between said second sign selector means and the input of said memory means, the output of said memory means being coupled to the input of said second adder means.

10. A directional coupler as in claim 5 wherein said memory means is an analog read/write memory.

11. A directional coupler as in claim 10, wherein said memory means is a number of capacitors connected in series with a corresponding number of switches connected to said compensation circuit, said switches being operated by means of said decoder, the feed-back link being a resistor connected between the output of the compensation circuit means and said switches.

* * * * *